Sept. 1, 1959 H. E. TEMPLE 2,902,159
FILTRATION APPARATUS
Filed May 28, 1958 3 Sheets-Sheet 1
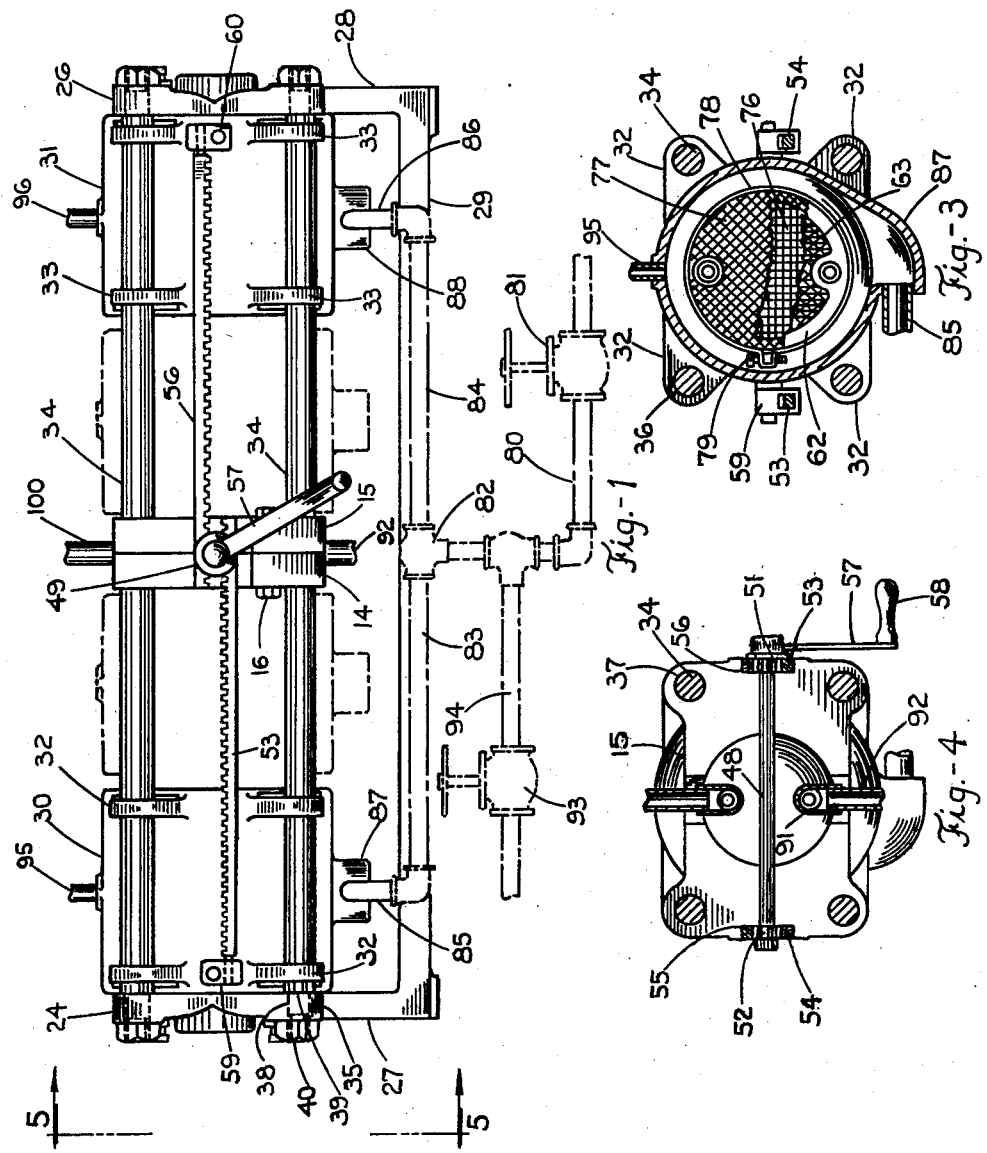
INVENTOR.
HIRAM E. TEMPLE
BY
Otto Moeller

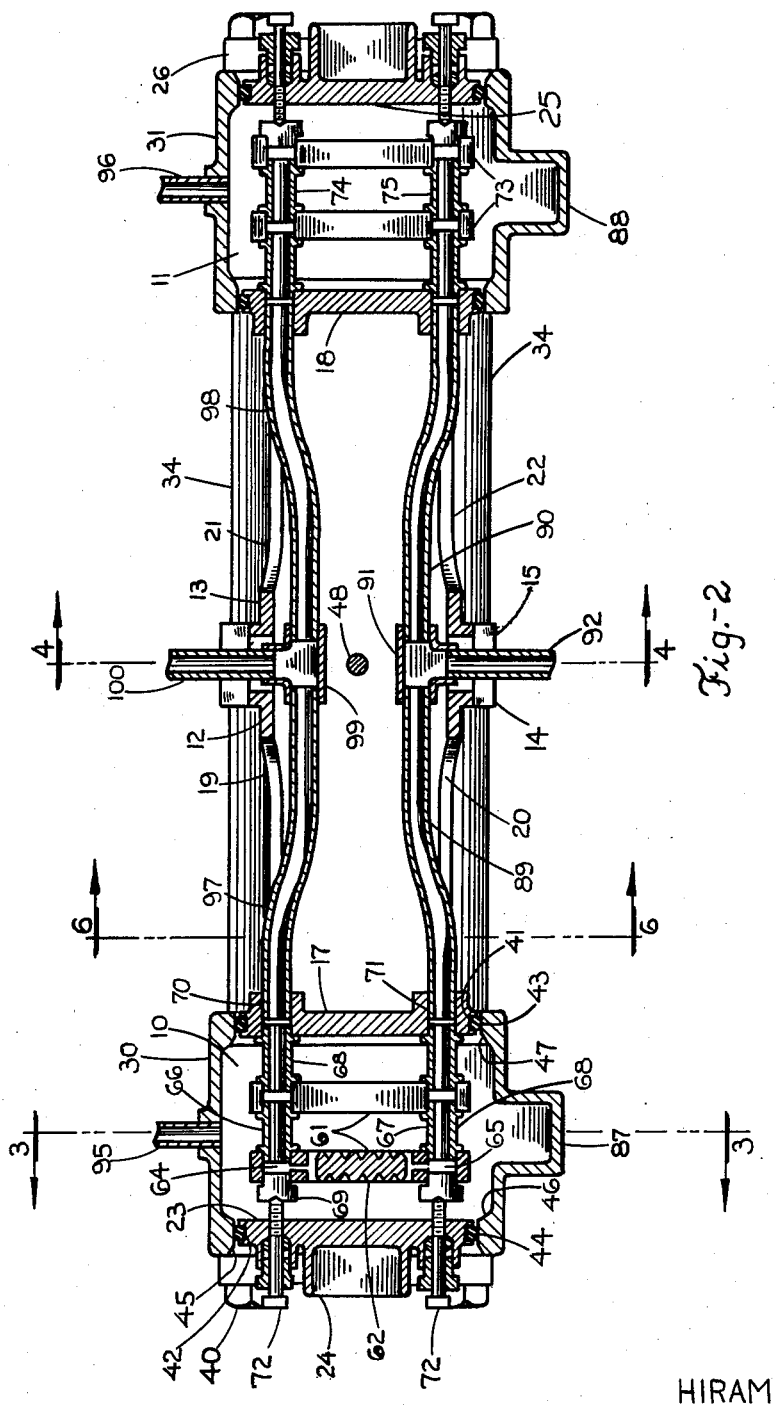

INVENTOR.
HIRAM E. TEMPLE

United States Patent Office 2,902,159
Patented Sept. 1, 1959

2,902,159

FILTRATION APPARATUS

Hiram E. Temple, Saginaw, Mich., assignor to Capitol Products Corporation, Mechanicsburg, Pa., a corporation of Pennsylvania Application May 28, 1958, Serial No. 738,387

9 Claims. (Cl. 210—230)

This invention relates to filtration apparatus designed to separate the liquid from the solid constituents of a dispersion of fine solids in a liquid, and more particularly to improvements in that type of filtration apparatus wherein a plurality of filter leaves are mounted on a tubular manifold within a cylindrical casing or drum.

In such filtration apparatus, the liquid to be filtered is introduced into the drum under pressure and is filtered by passing into the filter leaves. The clear filtrate flows from the interior of the leaves to a communicating manifold and thence to a point of discharge, while the separated solids are deposited in cake form on the exterior surface of the filter leaves.

It is customary to mount the filter leaf assembly for slidable movement axially of the drum for insertion therein and removal therefrom through an open end thereof. In such constructions, the filter leaf assembly carries a head, which serves as a tight closure for the open end of the drum when the filter leaf assembly is inserted into the drum. Since the filtering operation is carried out under pressure, there perforce must be provided suitable head locking mechanism to resist opening of the head against the pressure within the drum.

It has been found that the filtering effect of the filter medium diminishes rapidly as the time interval from the beginning of the filtration period increases, so that a high rate of filtration at the beginning of the filtration period rapidly diminishes as solids accumulate on the filter medium. It is consequently highly inefficient to continue filtration after the filter medium has reached a predetermined degree of saturation. Depending on the nature of the material being filtered the optimum filtering period may be as short as thirty seconds. It is apparent, therefore, that in prior filter apparatus constructions, the time required to manipulate the head locking means to free the head from the drum in order to withdraw the filter leaf assembly for the purpose of removing the cake from the filter leaves, and the time required to manipulate the head locking means to securely lock the head to the open end of the drum after reinsertion of the filter leaf assembly for the next filtering period, constitutes a considerable part of the total time for a complete filtering cycle, even where the optimum filtering period may be considerably greater than thirty seconds. The aggregate down time of the apparatus between filtering operations thus becomes an important factor, particularly when filtering is carried out in short cycles.

Accordingly it is an object of this invention to provide a filtering apparatus of the type wherein the filter leaf assembly and the drum are relatviely movable to enclose and expose the filter leaf assembly with a minimum down time of the apparatus between filtering operations thereby minimizing operational time and effecting production economy.

Another object is to provide a filtering apparatus of the type described wherein locking means and manipulation of locking means for securing and releasing the closure head means of the filter drum is dispensed with when enclosing or exposing the filter leaf assembly.

Another object is to provide a filtering apparatus of the type described constructed and arranged so that the resultant force of the pressurized liquid to be filtered against the movable element of the filter drum is negligible so that during the pressure filtering operation accidental opening of the movable element of the filter drum is obviated.

A further object is to provide a filtering apparatus of the foregoing character which is simple in construction, efficient in operation and economical to manufacture.

The foregoing objects and advantages of the present invention, together with various other objects and advantages thereof which will become apparent, may be attained with the exemplary embodiment of the invention which is described in detail hereinafter and which is illustrated in the accompanying drawings.

Referring to the drawings:

Figure 1 is a view of the apparatus in side elevation;

Figure 2 is a longitudinal vertical central sectional view through the apparatus shown in Figure 1 and taken on line 2—2 of Figure 5, with parts in elevation;

Figure 3 is a sectional view taken on line 3—3 of Figure 2;

Figure 4 is a sectional view taken on line 4—4 of Figure 2;

In the drawings:

Figure 5:
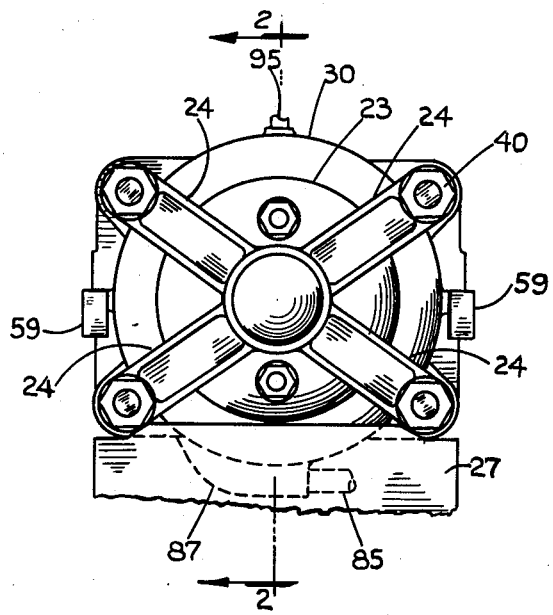
Figure 5 is an end elevation taken on line 5—5 of Figure 1.

A pair of longitudinally spaced axially alined filter receptacles or tanks are designated by the reference characters 10 and 11. Spanning the space between the tanks 10 and 11 are the tubular end to end related spacer bodies 12 and 13, the diameters of which are smaller than the diameters of the tanks 10 and 11.

Figure 6:
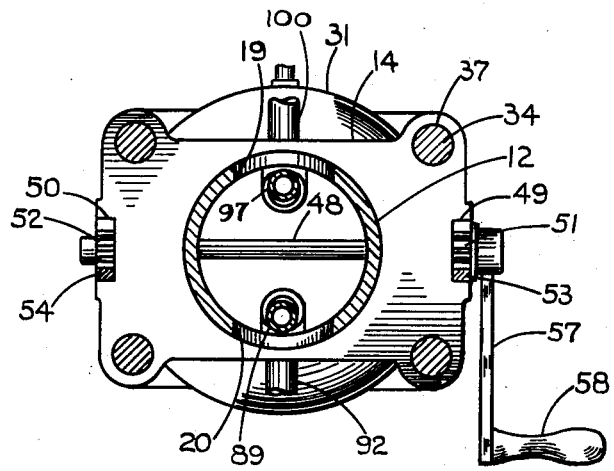
Figure 6 is a sectional view taken on line 6—6 of Figure 2.

At their adjacent ends the tubular spacer bodies 12 and 13 are provided respectively, with respective similar abutting peripheral flanges 14 nad 15, the outer configurations of which are of generally rectangular form, as may best be seen in Figures 4 and 6, which respectively show the flanges 15 of spacer body 13 and the flange 14 of spacer body 12. The spacer bodies 12 and 13 are rigidly secured together in axial end to end relation by bolts 16 extending through the abutting flanges 14 and 15.

Integrally formed with the ends of the spacer bodies 12 and 13, opposite their flanges 14 and 15, are disc shaped inner heads 17 and 18 arranged to form stationary inner end closures for the filter tanks 10 and 11. For a purpose to be later explained, the top and bottom surfaces of the tubular spacer body 12 are formed, respectively, with the U-shaped recesses 19 and 20, as best shown in Figures 2 and 6 with the open end of the U adjacent the plane of the head 17 and the bight of the U near but spaced from the plane of the flange 14. Similar recesses 21 and 22 are provided in the top and bottom surfaces of the tubular spacer body 13.

A disc shaped outer head 23 forms a stationary end closure for the end of the filter tank 10 opposite the inner head 17. The head 23 is provided on its outer face with integrally formed outwardly and diagonally radially extending arms 24 projecting beyond the periphery of the head 23, as best shown in Figures 2 and 5. In similar manner, the filter tank 11 is provided with an outer stationary head 25 having the projecting arms 26. The outer free ends of the lower pairs of arms 24 and 26 are mounted, respectively, in respective saddles 27 and 28 of support member 29.

A generally cylindrical casing 30, the ends of which have a sliding fit over the peripheries of the stationary heads 17 and 23, forms a movable closure for the filter tank 10. Likewise, a generally cylindrical casing 31 forms a movable closure for the filter tank 11. The casing 30 has integrally formed therewith adjacent its opposite ends and on each side thereof, laterally projecting upper and lower ears 32, as best shown in Figures 1 and 3. In similar manner, the casing 31 has integrally formed ears 33.

Tie rods 34 extend through axially alined openings 35 in the outer end portions of the arms 24 of the head 23, openings 36 in ears 32 of the casing 30, openings 37 in the enlarged corner portions of the flange 15 of the spacer body 13 and similar openings, not shown, in the flange 14 of spacer body 12, ears 33 of casing 31 and arms 26 of head 25. The spacer bodies 12 and 13 are thus supported by the tie rods 34 and may be secured thereto against longitudinal movement in any suitable manner. The casings 30 and 31 of the filter tanks 10 and 11 are also supported by the tie rods 34 and are arranged to slide therealong from positions forming closures for the filter tanks 10 and 11, as shown in full lines in Figure 1, to positions around the spacer bodies 12 and 13, as shown in phantom, whereby to expose the filter tanks 10 and 11.

The reduced end portions 38 of the tie rods 34, which project through the openings 35 in the arms 24 of the head 23, form shoulders 39 against which the marginal portions of the arms 24 defining the openings 35 abut, thereby providing means for locating the head 23. Nuts 40 threaded on the projecting threaded ends of the reduced tie rod portions 38 when drawn up against the arms 24, secure the head 23 in its properly located position. It is understood that a similar construction and arrangement of parts secures the head 25 in properly located position.

The liquid to be filtered is maintained under pressure in the tanks 10 and 11 during the filtering operation and means is provided for maintaining a pressure type seal during such filtering operation and that will at the same time permit convenient, rapid and efficient movement of the casings 30 and 31 between their positions shown in full lines and in phantom, in Figure 1. Referring to tank 10, the peripheral surfaces of the heads 17 and 23 are provided with peripheral grooves 41 and 42, arranged to receive O-rings 43 and 44, formed of yieldable material. The cross sectional diameters of the O-rings 43 and 44 are slightly greater than the depth of the respective grooves 41 and 42 in which they are received, so that they are compressed by the internal surface of the end portions of the casing 30 to provide a pressure tight seal. In order to minimize possible damage to the O-rings 42 and 43 as the casing 10 is moved from one to the other of its positions, the end portions of the casing 10 are provided with beveled surfaces, as shown at 45, 46 and 47. A similar sealing arrangement is provided for the filter tank 11.

The means for moving the casings 30 and 31 includes a horizontal transversely extending shaft 48 rotatably mounted in the confronting faces of the flanges 14 and 15 of the spacer body members 12 and 13. The opposite side edges of the flanges 14 and 15 are each provided with longitudinally extending slots 49 and 50 through which the ends of the shaft 48 project. Fixed on the projecting ends of the shaft 48 within the slots 49 and 50 are pinions 51 and 52, the diameter of the pinions 51 and 52 being less than the vertical extent of the slots 49 and 50. Oppositely disposed longitudinally extending racks 53 and 54 are secured at one of their respective ends to respective sides of the casing 30 by means of brackets 59. The other ends of the racks 53 and 54 are arranged to slide in the lower ends of the slots 49 and 50 in subjacent engagement with the pinions 51 and 52. Oppositely disposed longitudinally extending racks 55 and 56 are secured at one of their respective ends to respective sides of the casing 31 by means of brackets 60. The other ends of the racks 55 and 56 are guided through the upper ends of the slots 49 and 50 in superjacent engagement with the pinions 51 and 52.

An operating arm 57 and handle 58 are provided for turning the shaft 48 and the pinions 51 and 52 carried by the shaft 48 in clockwise or counter clockwise direction. Referring more particularly to Figure 1, it is evident that with the shaft 48 turning in counter clockwise direction, the racks 53 and 54 will move to the right while the racks 55 and 56 will move to the left, whereby the casings 30 and 31 will move from their positions shown in full lines to their positions shown in phantom. Then with the shaft 48 turning in clockwise direction, the racks 53 and 54 move to the left while racks 55 and 56 move to the right, whereby the casings 30 and 31 are returned to their original positions. While manual means are disclosed for turning the shaft 48 to move the casings 30 and 31, it is apparent that suitable power means may be employed to turn the shaft 48.

Mounted in the filter tank 10, as presently described, are a plurality of vertically disposed filter leaves 61, two being shown for purpose of illustration. Each of the filter leaves 61 includes a disc shaped plate 62, the opposite faces of which face inwardly of the periphery thereof are of grid-like construction as indicated at 63 forming a plurality of interconnected channels, as best shown in Figure 3. The interconnected channels of the grid portion 63 communicate with bores 64 and 65 extending through the upper and lower portions of the plate 62, the bores 64 and 65 forming portions of upper and lower manifolds 66 and 67, respectively. Pipe couplings 68 and caps 69 having press fits in the bores 64 and 65 of the filter leaf plates 62 and bores 70 and 71 in the upper and lower portions of the tank head 17 complete the manifolds 66 and 67. Clamping screws 72 threaded through the tank head 23 and engaging the caps 69 of the manifolds 66 and 67 serve to assist in supporting the manifolds and filter leaves and retaining them in assembled relation. The filter tank 11 is provided with a similar construction and arrangement of filter leaves 73 and upper and lower manifolds 74 and 75.

The filter leaves 61, and it will be understood that this applies also to filter leaves 73, include screens 76 of suitable mesh, covering the opposite faces of the plates 62, openings being provided to accommodate the manifolds 66 and 67. Suitable filter cloths 77 cover the screens 76 and overlap the peripheral edge of the plates 62. Clamp rings 78 surrounding the periphery of the plates 62, and clamp screws 79 firmly secure the filter cloths 77 to the plates 62, openings being provided in the filter cloths 76 to accommodate the manifolds 66 and 67.

In operation, liquid to be filtered from a source of supply is pumped under pressure through pipe 80, in which normally open valve 81 is interposed. From pipe 80, the liquid flows through a T pipe fitting 82 into flexible hoses 83 and 84, then through connected pipe fittings 85 and 86 which are in communication with sumps 87 and 88 formed in the bottoms of the tank casings 30 and 31. The solids in the liquid to be filtered are deposited in cake form on the filter cloths 77 while the clear filtrate passes through into the channels of the grid portion 63 of the plates 62 and thence into the lower manifolds 67 and 75. Pipes 89 and 90 communicating at their opposite ends with the manifolds 67 and 75 extend toward each other through the openings 20 and 22 of the tubular spacer bodies 12 and 13 and conduct the filtrate to a common T pipe fitting 91 to which is connected a common outlet pipe 92.

When the rate of filtration drops off sharply, which may occur after an interval as short as thirty seconds, valve 81 is closed and previously closed valve 93 in outlet pipe 94, which is connected with pipe 80 between T fitting 82 and valve 81, is opened, whereupon the liquid in tanks 10 and 11 is drained and may, if desired, be returned to the source of liquid to be filtered. In order to facilitate drainage of the tanks 10 and 11, they may be suitably connected by lines 95 and 96 to a source of air under pressure, suitable valves, not shown, being interposed in the lines 95 and 96. When the tanks 10 and 11 have been drained, introduction of air under pressure through pipes 95 and 96 is discontinued, and the casings 30 and 31 are moved to the positions shown in phantom in Figure 1, exposing the filter leaves 61 and 73. The filter cake may then be loosened and removed from the filter cloths 77 in any desired manner, as by introducing air under pressure from upper manifolds 66 and 74 into the filter leaves 61 and 73 and blowing the cake loose from the filter cloths 77. The cake material dropping from the filter leaves may be collected on a take-away conveyor or receptacle, not shown, disposed beneath the tanks 10 and 11. Air is introduced into upper manifolds 66 and 74 through pipes 97 and 98 which extend toward each other from manifolds 66 and 74 through the openings 19 and 21 of the tubular spacer bodies 12 and 13, and communicate with a common T pipe fitting 99 to which is connected a pipe 100 leading from a source of air under pressure.

After the filter cake has been removed from the filter cloths 77, introduction of air under pressure through pipe 100 is discontinued. The casings 30 and 31 are then moved back to their original positions to form a pressure tight closure for the tanks 10 and 11, with no locking means being required to be manipulated. The valve 93 is now closed and valve 81 is opened, whereupon the cycle is repeated.

While two tanks are disclosed for simultaneous operation, it will be apparent that the construction may be modified to embody a single tank.

I claim:

1. A filter device comprising a filter unit, a pair of fixed spaced apart disc shaped heads, a tubular open ended movable casing having end portions fitting closely about the peripheries of said heads in one position of said casing to form with said heads an enclosure for said filter unit, guide means extending from one to and beyond the other of said heads, said casing having means engaging said guide means for axial slidable movement of said casing therealong between said one position and a position exposing said filter unit, and means for moving said casing.

2. A filter device comprising a filter unit, a pair of fixed spaced apart disc shaped heads, a tubular open ended movable casing having end portions fitting closely about the peripheries of said heads in one position of said casing to form with said heads an enclosure for said filter unit, guide support means extending along said heads and projecting therebeyond, said casing being slidably supported by said guide support means for axial movement therealong between said one position and a position exposing said filter unit, and means for moving said casing.

3. A filter device comprising a filter unit, a pair of fixed spaced apart disc shaped heads, a tubular open ended movable casing having end portions fitting closely about the peripheries of said heads in one position of said casing to form with said heads an enclosure for said filter unit, guide means extending from one to and beyond the other of said heads, said casing having means engaging said guide means for axial slidable movement of said casing therealong between said one position and a position exposing said filter unit, and compressible means between the peripheries of said heads and the said end portions of said casing arranged to be under compression in the said one position of said casing to form a pressure tight seal between said heads and said casing.

4. A filter device comprising a filter unit, a pair of fixed spaced apart disc shaped heads, a tubular open ended movable casing having end portions fitting closely about the peripheries of said heads in one position of said casing to form with said heads an enclosure for said filter unit, guide support means extending along said heads and projecting therebeyond, said casing being slidably supported by said guide support means for axial movement therealong between said one position and a position exposing said filter unit, and compressible means between the peripheries of said heads and the said end portions of said casing arranged to be under compression in the said one position of said casing to form a pressure tight seal between said heads and said casing.

5. A filter device comprising a filter unit, a pair of fixed spaced apart disc shaped heads, a tubular open ended movable casing having end portions fitting closely about the peripheries of said heads in one position of said casing to form with said heads an enclosure for said filter unit, guide means extending from one to and beyond the other of said heads, said casing having means engaging said guide means for axial slidable movement of said casing therealong between said one position and a position exposing said filter unit, an annular groove in the periphery of each of said heads, an O-ring of compressible material seated in each of said grooves and having a cross sectional diameter greater than the depth of said grooves whereby in said one position of said casing said O-rings are compressed to form a pressure tight seal between said heads and said casing.

6. A filter device comprising a filter unit, a pair of fixed spaced apart disc shaped heads, a tubular open ended movable casing having end portions fitting closely about the peripheries of said heads in one position of said casing to form with said heads an enclosure for said filter unit, guide support means extending along said heads and projecting therebeyond, said casing being slidably supported by said guide support means for axial movement therealong between said one position and a position exposing said filter unit, an annular groove in the periphery of each of said heads, an O-ring of compressible material seated in each of said grooves and having a cross sectional diameter greater than the depth of said grooves whereby in said one position of said casing said O-rings are compressed to form a pressure tight seal between said heads and said casing.

7. A filter device comprising a pair of filter units, a pair of axially spaced substantially cylindrical drums each adapted to form an enclosure for one of said filter units, a spacer body member between and separating said drums, each of said drums having a fixed inner and outer disc shaped head and each of said drums having a movable open ended tubular casing fitting at its ends closely about the peripheries of the inner and outer heads of said drums, guide support means adjacent and extending the length of said drums and spacer body member, the said casings of said drums being slidably supported by said guide support means for axial movement therealong to a position about said spacer body members for exposing said filter units.

8. A device according to claim 7, wherein the inner disc shaped heads of said drums are integrally formed with the opposite ends of said spacer body member.

9. A filter device comprising a pair of filter units, a pair of axially spaced substantially cylindrical drums each adapted to form an enclosure for one of said filter units, a spacer body member between and separating said drums, each of said drums having a fixed inner and outer disc shaped head and each of said drums having a movable open ended tubular casing fitting at its ends closely about the peripheries of the inner and outer heads of said drums, guide support means without and extending the length of said drums and spacer body member, said casings having means exteriorly thereof slidably mounting the casings on said guide support means for axial movement therealong to a position about said spacer body member for exposing the filter units, an annular groove in the periphery of each of said heads, and an O-ring of compressible material seated in each of said grooves and having a cross sectional diameter greater than the depth of said grooves whereby when said casings are moved from said last to said first position, said O-rings are compressed to form a pressure tight seal between said heads and the close fitting ends of said casings.

References Cited in the file of this patent

UNITED STATES PATENTS

| | | |
|---|---|---|
| 1,015,960 | Kelly | Jan. 30, 1912 |
| 1,813,601 | Bacheldor | July 7, 1931 |